(12) United States Patent
Kinoshita

(10) Patent No.: US 8,848,209 B2
(45) Date of Patent: Sep. 30, 2014

(54) IMAGE SENSOR UNIT, IMAGE READING APPARATUS, AND IMAGE FORMING APPARATUS

(71) Applicant: Canon Components, Inc., Saitama (JP)

(72) Inventor: Junya Kinoshita, Saitama (JP)

(73) Assignee: Canon Components, Inc. (JP)

( * ) Notice: Subject to any disclaimer, the term of this patent is extended or adjusted under 35 U.S.C. 154(b) by 0 days.

(21) Appl. No.: 13/723,801

(22) Filed: Dec. 21, 2012

(65) Prior Publication Data

US 2013/0163021 A1    Jun. 27, 2013

(30) Foreign Application Priority Data

Dec. 22, 2011  (JP) ................. 2011-281601
Dec. 14, 2012  (JP) ................. 2012-273432

(51) Int. Cl.
*G06F 3/12*  (2006.01)
*H04N 1/193* (2006.01)
*H04N 1/192* (2006.01)
*H04N 1/028* (2006.01)

(52) U.S. Cl.
CPC ......... *H04N 1/02815* (2013.01); *H04N 1/1932* (2013.01); *H04N 1/1938* (2013.01); *H04N 1/192* (2013.01); *H04N 1/1935* (2013.01); *H04N 1/1934* (2013.01); *H04N 1/193* (2013.01); *H04N 1/1931* (2013.01); *H04N 1/1933* (2013.01)
USPC ....... 358/1.13; 250/208.1; 250/216; 358/401; 358/483; 358/514

(58) Field of Classification Search
USPC ................ 358/1.13, 401, 474, 483, 505, 514; 250/208.1, 216; 257/80; 29/876, 877, 29/881; 349/86
See application file for complete search history.

(56) References Cited

U.S. PATENT DOCUMENTS

| 5,594,260 | A   | 1/1997  | Tsutsui et al. | |
|---|---|---|---|---|
| 2003/0029989 | A1* | 2/2003 | Stettner et al. | 250/208.1 |
| 2003/0043415 | A1* | 3/2003 | Proctor | 358/401 |
| 2007/0035785 | A1* | 2/2007 | Kuan | 358/474 |
| 2008/0002104 | A1* | 1/2008 | Tokunaga | 349/86 |
| 2009/0073519 | A1* | 3/2009 | Hiromatsu | 358/505 |
| 2009/0237748 | A1* | 9/2009 | Yabuta | 358/474 |
| 2010/0213355 | A1  | 8/2010 | Wang et al. | |
| 2013/0322824 | A1* | 12/2013 | Isenhour et al. | 385/58 |

FOREIGN PATENT DOCUMENTS

| EP | 0 751 568 A2 | 1/1997 |
|---|---|---|
| EP | 1 650 949 A1 | 4/2006 |
| JP | 7086541 A | 3/1995 |

OTHER PUBLICATIONS

Extended European Search Report dated Dec. 20, 2013 of the corresponding EPC Application No. 12198866.1.

* cited by examiner

*Primary Examiner* — David S Cammack
(74) *Attorney, Agent, or Firm* — Rossi, Kimms & McDowell LLP

(57) ABSTRACT

A sensor substrate unit is formed by connecting edges of a plurality of sensor substrates in a longitudinal direction. Sensor chips at the edges are mounted beyond the edges. The edges include convex portions and convex portions for connecting the sensor substrates. Farthest tips of the sensor chips are positioned inside of farthest edges of the convex portions and inside of farthest edges of the convex portions in the longitudinal direction.

8 Claims, 11 Drawing Sheets

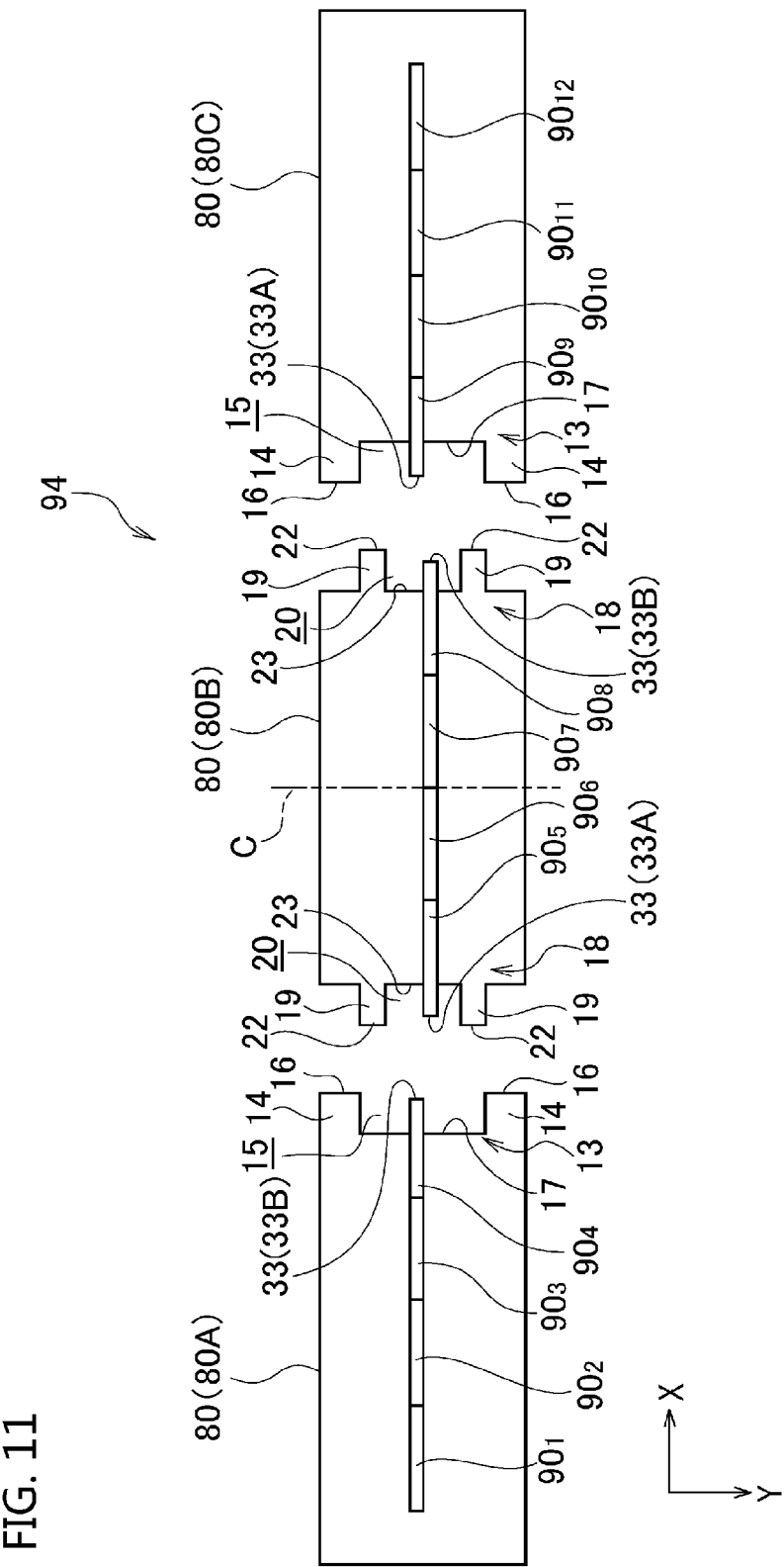

IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2011-281601, filed on Dec. 22, 2011, and the Japanese Patent Application No. 2012-273432, filed on Dec. 14, 2012, the entire contents of which are incorporated herein by reference.

BACKGROUND OF THE INVENTION

1. Field of the Invention

The present invention relates to an image sensor unit, an image reading apparatus, and an image forming apparatus. Particularly, the present invention relates to an image sensor unit, an image reading apparatus, and an image forming apparatus that read large originals and the like.

2. Description of the Related Art

Readable lengths (hereinafter, "read lengths") of originals are generally about A4, B4, and A3 sizes in an image sensor unit used in an image reading apparatus, such as a facsimile and a scanner. In recent years, an elongated image sensor unit that can read large originals in A2, A1, and A0 sizes exceeding the read length of A3 size is used in an image reading apparatus, such as an electronic white board.

In the image sensor unit of the image reading apparatus that reads large originals and the like exceeding the A3 size, a plurality of sensor substrates shorter than the A3 size, on which a plurality of sensor chips are mounted, are arranged in series in a main-scan direction. In the serial arrangement of the sensor substrates, it is ideal to extremely reduce intervals between the sensor chips mounted on adjacent sensor substrates to reduce image missing sections in reading. However, the size of the characters of an image to be read is large in the image sensor unit used for an electronic white board or the like, and there is no problem even if the intervals between the sensor chips are large.

On the other hand, the same read quality as that of a general scanner is demanded in an image reading apparatus that needs fine reading of a large map and the like, and generation of an image missing section needs to be prevented. For example, Patent Document 1 discloses a photoelectric conversion apparatus elongated by connecting a plurality of wiring boards (sensor substrates) on which LED chips (sensor chips) are arranged.

Patent Document 1

Japanese Laid-Open Patent Publication No. 7-086541

However, the sensor chips protrude from ends of the sensor substrates in the photoelectric conversion apparatus disclosed in Patent Document 1. Therefore, the sensor chips may be damaged when, for example, the sensor substrates are connected or when the sensor substrates provided with the sensor chips are stored.

SUMMARY OF THE INVENTION

The present invention has been made in view of the foregoing problem, and an object of the present invention is to prevent damage to sensor chips.

The present invention provides an image sensor unit including: a light source that illuminates an object to be read; a sensor substrate unit that is connected with a plurality of sensor substrates including a plurality of photoelectric conversion elements arranged and mounted in a line in a longitudinal direction; a light condenser that focuses light from the object to be read on the sensor substrate unit; and a supporting body that supports the light source, the sensor substrate unit, and the light condenser, wherein the sensor substrate unit is formed by connecting edges of the sensor substrates in the longitudinal direction, the photoelectric conversion elements at the edges are mounted beyond the edges, the edges include connection means that connects the sensor substrates, and farthest tips of the photoelectric conversion elements are positioned inside of farthest edges of the connection means in the longitudinal direction.

The present invention provides an image reading apparatus including: an image sensor unit; and image reading means that reads light from an object to be read while relatively moving the image sensor unit and the object to be read, wherein the image sensor unit is the image sensor unit described above.

The present invention provides an image forming apparatus including: an image sensor unit; image reading means that reads light from an object to be read while relatively moving the image sensor unit and the object to be read; and image forming means that forms an image on a recording medium, wherein the image sensor unit is the image sensor unit described above.

BRIEF DESCRIPTION OF DRAWINGS

FIG. 11 is a plan view of a sensor substrate unit 94 according to another embodiment.

DETAILED DESCRIPTION OF THE PREFERRED EMBODIMENTS

Figure 1:
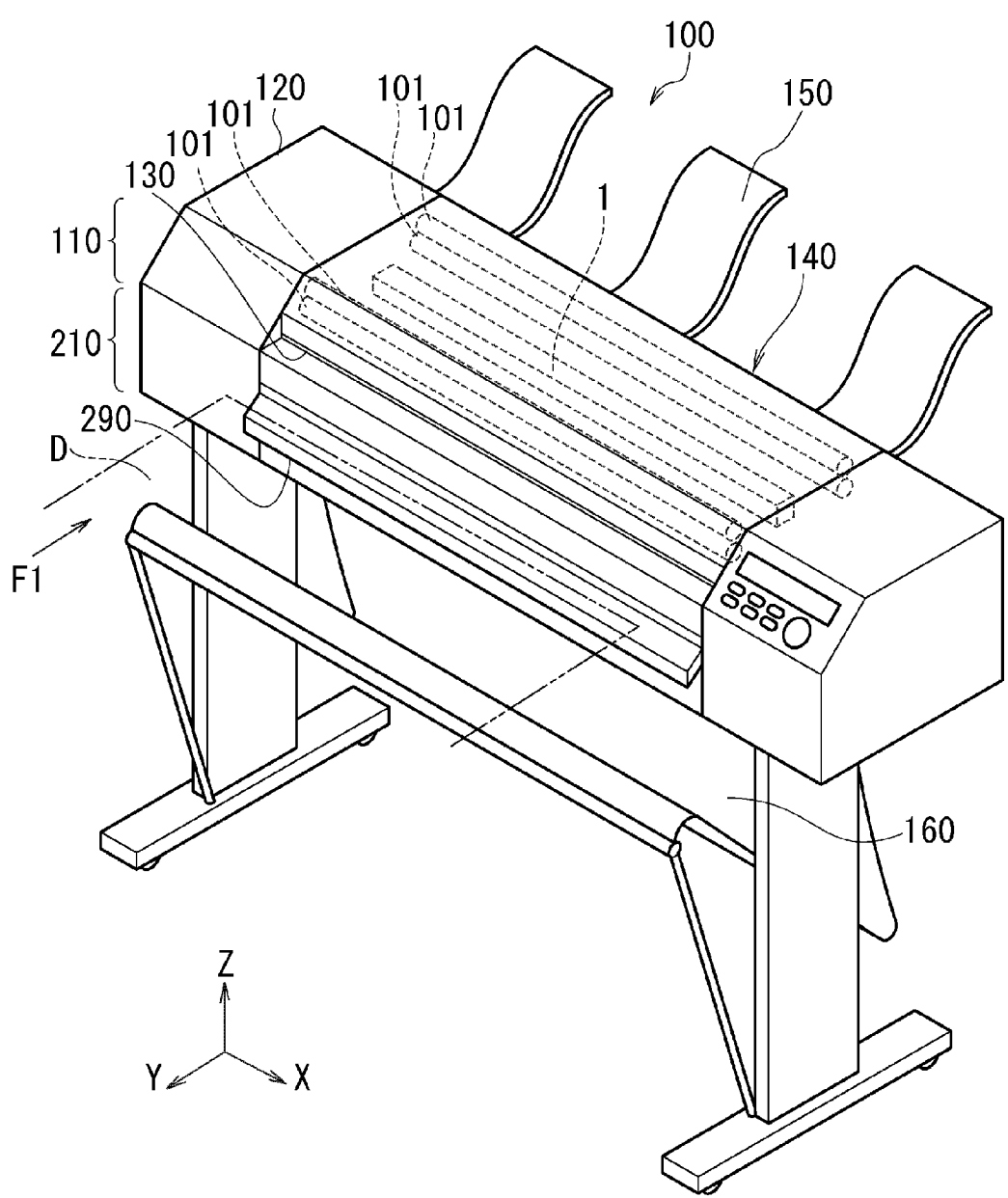
FIG. 1 is a perspective view illustrating an appearance of an MFP 100 including an image sensor unit 1 according to the present embodiments.

Embodiments that can apply the present invention will now be described in detail with reference to the drawings.

In the present embodiments, an image sensor unit described later as well as an image reading apparatus and an image forming apparatus to which the image sensor unit is applied will be described. In the drawings described below, a main-scan direction of the image sensor unit is indicated by an X direction, a sub-scan direction is indicated by a Y direction, and a direction orthogonal to the main-scan direction and the sub-scan direction is indicated by a Z direction, as necessary. In the image reading apparatus and the image forming apparatus, the image sensor unit emits light to an original D as an object to be read, and reflected light is converted to an electric signal to read an image (reflection reading). The object to be read is not limited to the original D, and other objects to be read can also be applied. Transmission reading can also be applied.

A structure of a multi-function printer (MFP) as sample of an image reading apparatus or an image forming apparatus will be described with reference to FIG. 1. FIG. 1 is a perspective view illustrating an appearance of an MFP 100 that can handle a large original. As shown in FIG. 1, the MFP 100 includes: an image reading portion 110 as image reading means that is a sheet-feed type image scanner and that reads reflected light from a large original D in an A0 size, A1 size, or the like; and an image forming portion 210 as image forming means that forms (prints) an image of the original D on a roll sheet R (recording paper) as a recording medium.

The image reading portion 110 has a function of a so-called image scanner and is configured, for example, as follows. The image reading portion 110 includes: a housing 120; a paper feeding opening 130; an original discharge opening 140; an original recovery unit 150; a sheet recovery unit 160; an image sensor unit 1; and original conveyor rollers 101.

The image sensor unit 1 is, for example, a contact image sensor (CIS) unit. The image sensor unit 1 is fixed in the housing 120.

In the image reading portion 110, the original D inserted from the paper feeding opening 130 to the housing 120 is placed between the original conveyor rollers 101 rotated and driven by a driving mechanism and conveyed relative to the image sensor unit 1 at a predetermined conveyance speed. The image sensor unit 1 optically reads the conveyed original D, and a sensor chip 30 described later converts the original D to an electric signal to perform a reading operation of an image. The original D subjected to image reading is conveyed by the original conveyor rollers 101 and discharged from the original discharge opening 140. The original recovery unit 150 disposed on the backside of the housing 120 recovers the original D discharged from the original discharge opening 140.

Figure 2:
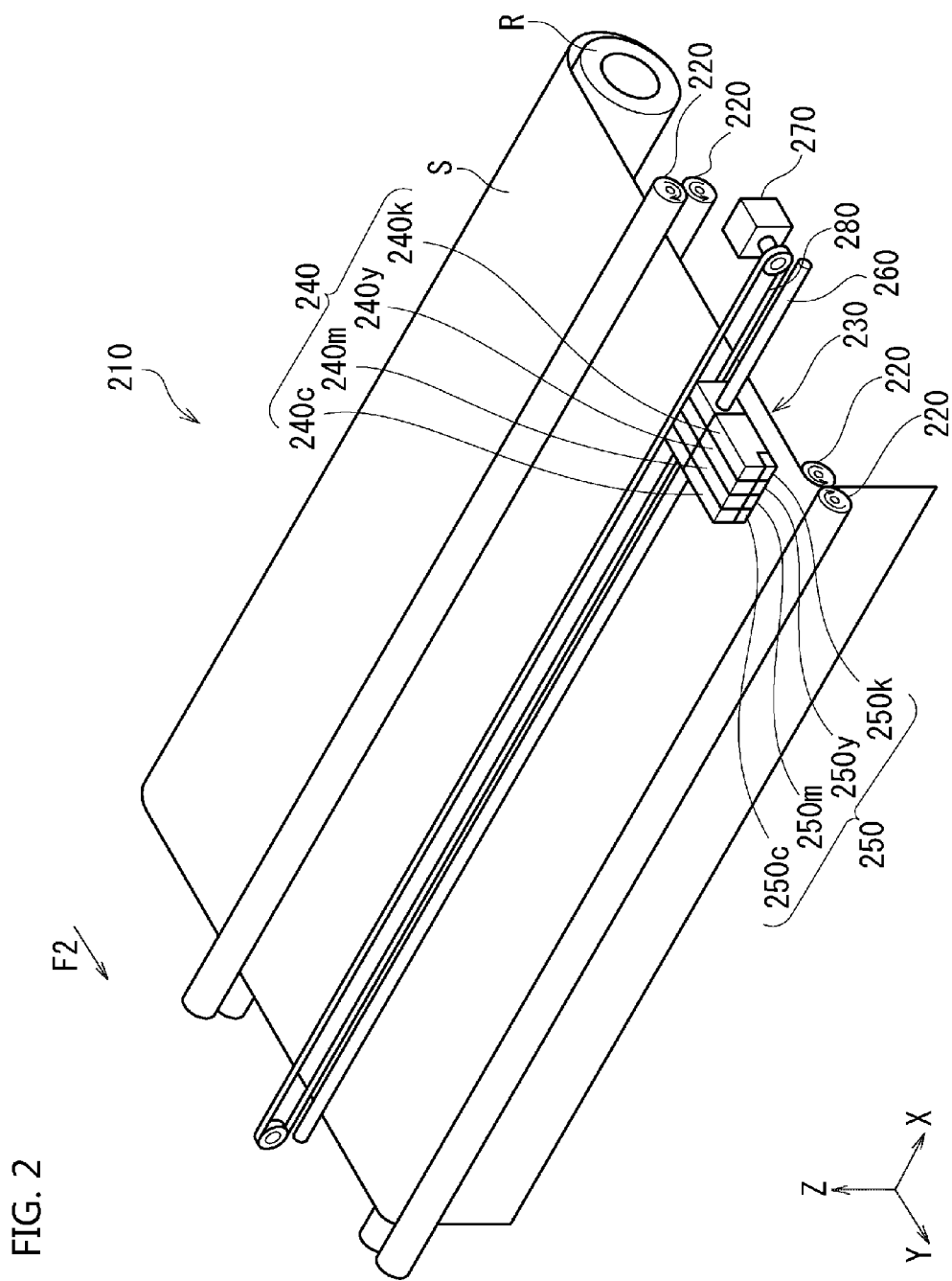
FIG. 2 is a schematic view illustrating a structure of an image forming portion 210 in the MPF 100.

FIG. 2 is a schematic view illustrating a structure of the image forming portion 210.

The image forming portion 210 with a function of a so-called printer is housed in the housing 120 and is configured, for example, as follows. The image forming portion 210 includes a roll sheet R, sheet conveyor rollers 220, and a printer head 230. The printer head 230 includes, for example, ink tanks 240 (240c, 240m, 240y, and 240k) with cyan C, magenta M, yellow Y, and black K inks and discharge heads 250 (250c, 250m, 250y, and 250k) arranged on the ink tanks 240, respectively. The image forming portion 210 also includes a printer head slide shaft 260, a printer head drive motor 270, and a belt 280 attached to the printer head 230. As shown in FIG. 1, the image forming portion 210 further includes a sheet discharge opening 290 from which a printed sheet S is discharged.

In the image forming portion 210, the sheet S as one end of the continuous roll sheet R is placed between the sheet conveyor rollers 220 rotated and driven by the driving mechanism and is conveyed in a conveyance direction F2 to a printing position. The printer head drive motor 270 mechanically moves the belt 280, and the printer head 230 moves in the printing direction (X direction) along the printer head slide shaft 260 to print the image on the sheet S based on the electric signal. The operation is repeated until the printing is finished, and the printed sheet S is cut in the X direction. The cut sheet S is discharged from the sheet discharge opening 290 by the sheet conveyor rollers 220. The sheet recovery unit 160 disposed below the housing 120 recovers the sheet S discharged from the sheet discharge opening 290.

Although an inkjet-type image forming apparatus has been described as the image forming portion 210, the type can be any type, such as an electrophotographic type, a thermal transfer type, and a dot impact type.

(First Embodiment)

Components of the image sensor unit 1 will be described with reference to FIGS. 3 and 4.

Figure 3:
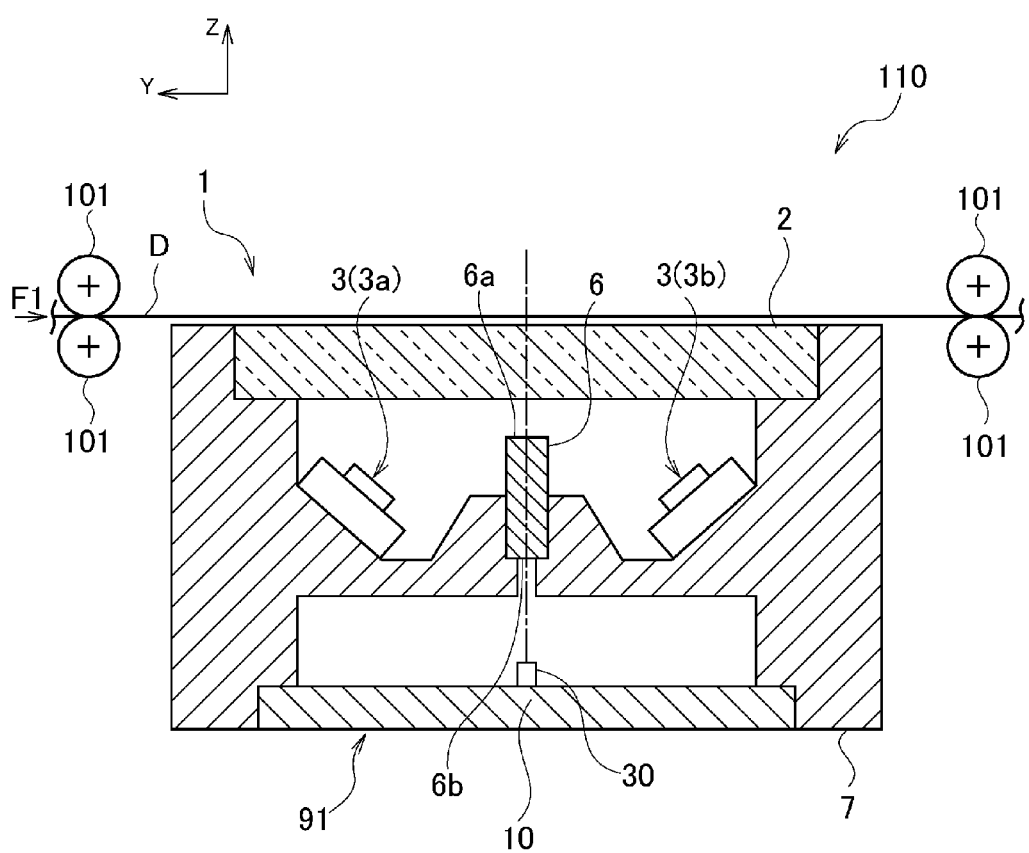
FIG. 3 is a sectional view illustrating a configuration of part of the MFP 100 including the image sensor unit 1 according to the present embodiments.

FIG. 3 is a sectional view illustrating a configuration of part of the image reading portion 110 including the image sensor unit 1. FIG. 4 is a schematic exploded perspective view of the image sensor unit 1.

The image sensor unit 1 includes a cover glass 2, light sources 3, rod-lens arrays 6 as light condensers, a sensor substrate unit 91, sensor chips 30 as photoelectric conversion elements, a frame 7 as a supporting body that houses these components, and the like. The cover glass 2 and the frame 7 of the components are formed long in the main-scan direction to handle the read length of the large original D.

The frame 7 houses the components of the image sensor unit 1. The frame 7 is rectangular, and a plurality of projections and recesses are formed inside to position and support the components of the image sensor unit 1.

The cover glass 2 prevents dust from entering the frame 7. The cover glass 2 is planar and fixed on an upper part of the frame 7.

The light sources 3 (3a and 3b) illuminate the original D. The light sources 3a and 3b are fixed at positions below the cover glass 2 and symmetric about the rod-lens arrays 6. As shown in FIG. 4, each light source 3 includes, for example: light emitting elements 4r, 4g, and 4b with wavelengths of three colors of red R, green G, and blue B; and a substrate 5 for mounting the light emitting elements 4r, 4g, and 4b. The light emitting elements 4r, 4g, and 4b are, for example, LED chips and are mounted at predetermined intervals in a predetermined order on the substrate 5 formed long in the main-scan direction. The light sources 3a and 3b of the present embodiment include a plurality of substrates arranged in the main-scan direction, the substrates used in an image sensor unit that reads normal sized originals (for example, A4 and A3 sizes).

The rod-lens arrays 6 are optical members to focus the reflected light from the original D on the sensor chip 30 mounted on a sensor substrate 10. The rod-lens array 6 is disposed at a center position of the light source 3a and the light source 3b. The sensor chip 30 is positioned on an extension of an optical axis (alternate long and short dash line illustrated in FIG. 3) formed between an incident surface 6a and an emission surface 6b of the rod-lens array 6. The rod-lens array 6 includes a plurality of imaging elements (rod-lenses) of an erect equal magnification imaging type arranged in the main-scan direction. The rod-lens arrays 6 of the present embodiment are formed by arranging a plurality of rod-lens arrays in the main-scan direction, the rod-lens arrays used in an image sensor unit that reads normal sized originals.

Optical members with various well-known light condensing functions, such as various micro-lens arrays, can be applied as the light condensers.

The sensor substrate unit 91 includes a plurality of sensor substrates 10. The sensor substrate 10 includes a plurality of sensor chips 30 in the main-scan direction (longitudinal direction), the sensor chips 30 converting the reflected light focused by the rod-lens array 6 to electric signals. The sensor substrate unit 91 is fixed under the frame 7. The sensor substrates 10 in a normal size are arranged and connected in the main-scan direction to form the sensor substrate unit 91 of the present embodiment at a predetermined read length. In this case, the sensor substrates 10 can be connected by a method described later to prevent damage of the sensor chips 30.

When the MFP 100 including the image sensor unit 1 configured as described above reads the original D, the image reading portion 110 successively activates the light emitting elements 4r, 4g, and 4b of the light sources 3a and 3b of the image sensor unit 1 to emit light on the original D conveyed by the original conveyor rollers 101 in a conveyance direction F1 at a predetermined conveyance speed. The light emitted from the light sources 3a and 3b is directed to the reading surface of the original D from two directions across the rod-lens array 6 to linearly and uniformly radiate the light throughout the main-scan direction. The original D reflects the radiated light to focus the light on photodiodes 31 described later of the sensor chips 30 through the rod-lens arrays 6. The sensor chips 30 convert the focused reflected light to electric signals, and a signal processing unit (not shown) processes the electric signals.

In this way, the image reading portion 110 reads the reflected light of R, G, and B of one scan line to complete the reading operation of one scan line in the main-scan direction of the original D. After the end of the reading operation of one scan line, a reading operation of the next one scan line is performed in the same way as the operation described above along with the movement of the original D in the sub-scan direction. In this way, the image reading portion 110 repeats the reading operation of one scan line, while conveying the original D in the conveyance direction F1, to read the image of the entire surface of the original D.

A configuration of the sensor substrate unit 91 will be described. The following description is about connection of two sensor substrates 10 in a line in the main-scan direction.

Figure 5A:
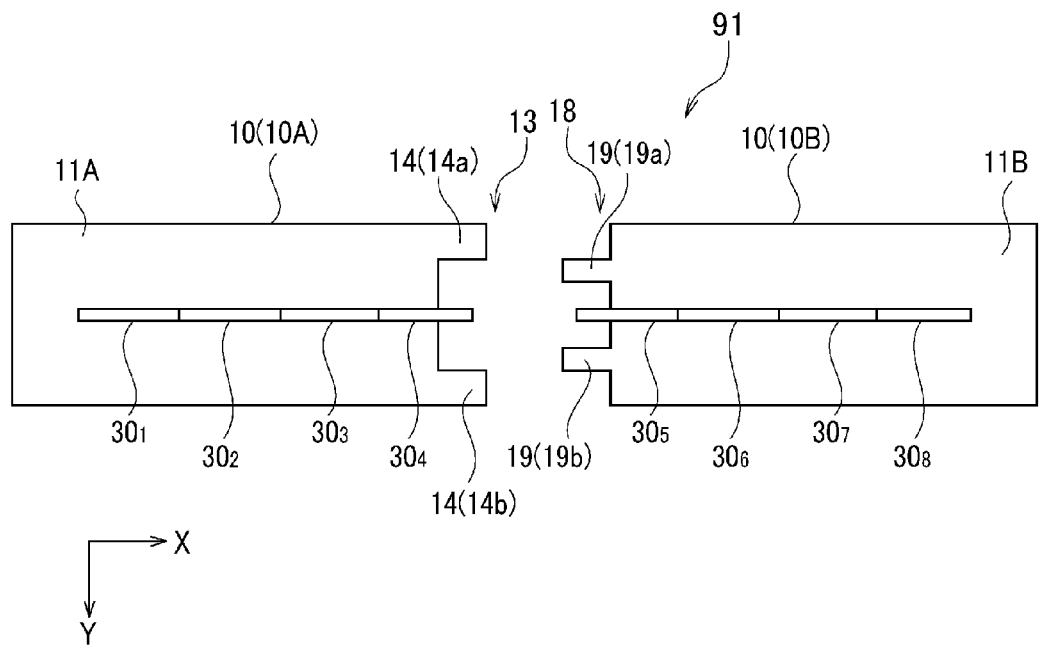
FIG. 5A is a plan view of a sensor substrate unit 91 according to a first embodiment.
Figure 5B:
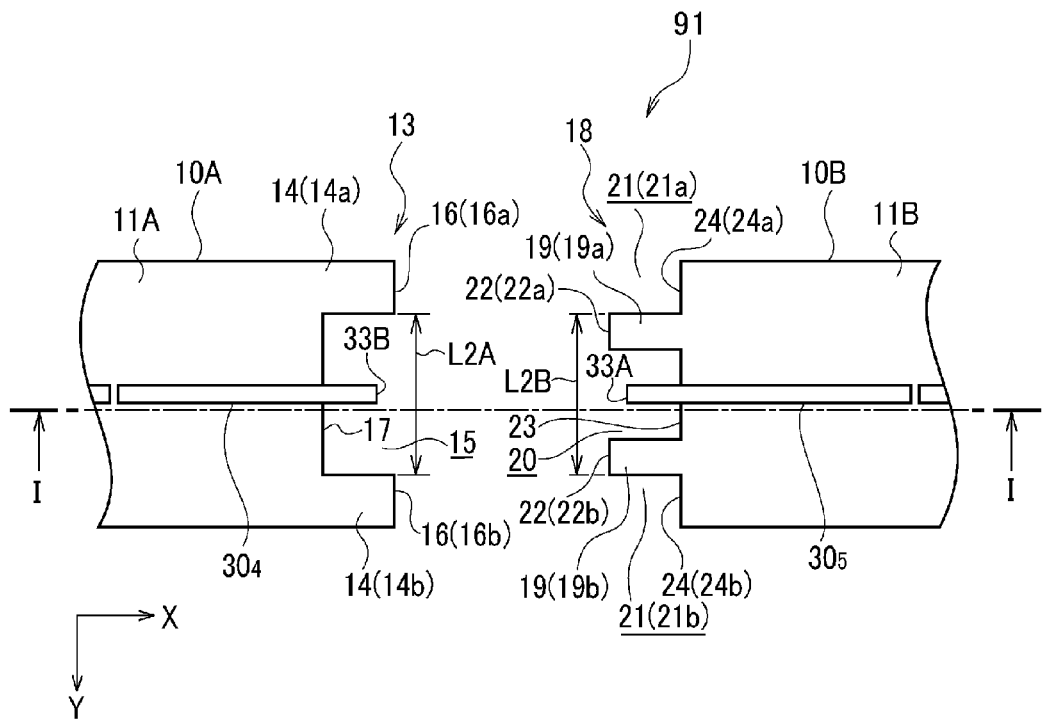
FIG. 5B is an enlarged plan view of the sensor substrate unit 91 according to the first embodiment.
Figure 5C:
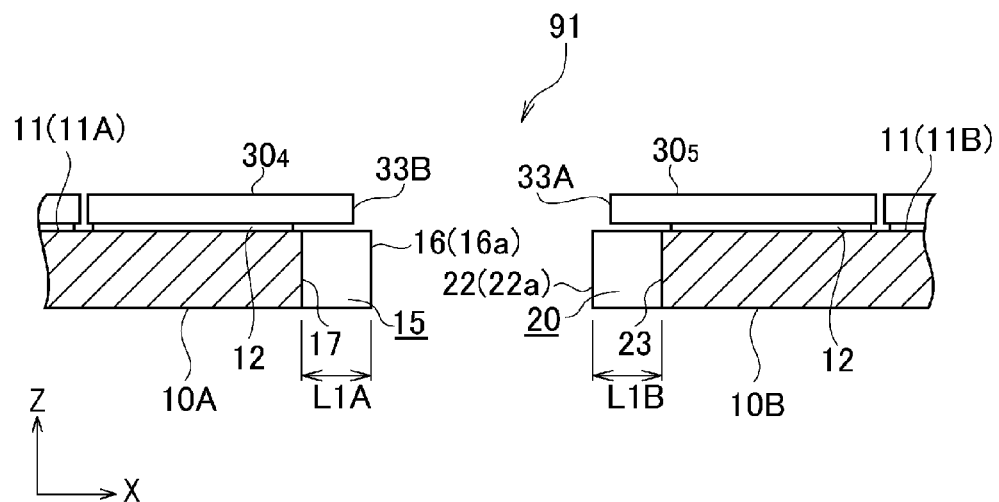
FIG. 5C is a sectional view of the sensor substrate unit 91 according to the first embodiment.

FIG. 5A is a plan view of the sensor substrate unit 91. FIG. 5B is an enlarged plan view of a section of the connection of the sensor substrate unit 91 in FIG. 5A. FIG. 5C is a sectional view of a I-I line shown in FIG. 5B.

As shown in FIG. 5A, the sensor substrates 10A and 10B are formed in rectangular planar shapes long in the main-scan direction. For example, ceramic substrates or glass epoxy substrates can be used as the sensor substrates 10A and 10B.

A plurality of (four each in FIG. 5A) sensor chips 30 ($30_1$ to $30_4$ and $30_5$ to $30_8$) are mounted on mounting surfaces 11A and 11B of the sensor substrates 10A and 10B, the sensor chips 30 arranged in a line in the main-scan direction (longitudinal direction) on the sensor substrates 10A and 10B. As shown in FIG. 5C, the sensor chips 30 ($30_1$ to $30_8$) are fixed on the mounting surfaces 11A and 11B by, for example, a thermosetting adhesive 12.

Figure 6:
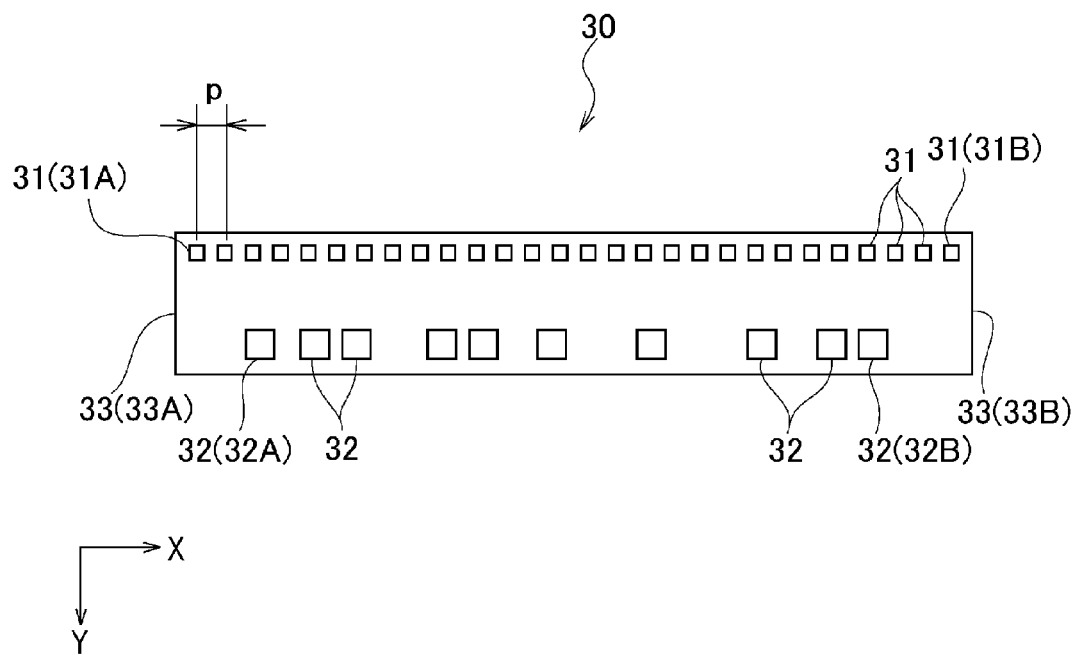
FIG. 6 is a plan view illustrating a configuration of a sensor chip 30.

FIG. 6 is a plan view illustrating a configuration of the sensor chip 30.

The sensor chip 30 includes a plurality of photodiodes 31 as light receiving elements, a plurality of pads 32, circuit patterns (not shown), and the like. The photodiodes 31 play a role to detect the reflected light and are arranged in a line in the main-scan direction at equal pitches p. The photodiodes 31 are arranged throughout the whole length in the main-scan direction of the sensor chip 30. That is, the photodiodes 31A and 31B positioned at left and right edges of the sensor chip 30 are brought into close contact with farthest tips 33 (33A and 33B) in the main-scan direction of the sensor chip 30.

Meanwhile, the pads 32 play various roles, beginning with input/output pads 32A and 32B that input and output a start signal for detecting the reflected light. The input/output pads 32A and 32B are connected to the input/output pads 32A and 32B of the adjacent sensor chip 30 by wire bonding through thin metallic wires. The connection may be through the circuit patterns (not shown) on the sensor substrates 10. The start signal of the first sensor chip 30 of each sensor substrate is input from the outside. The input/output pads 32A and 32B are disposed farther from the farthest tips 33A and 33B of the sensor chip 30 compared to the photodiodes 31A and 31B. The circuit patterns of an analog output circuit, a shift register, and the like (not shown) on the sensor chip 30 and desired circuit patterns (not shown) on the sensor substrate 10 are connected by thin metallic wires through the pads 32.

The disposition of the sensor substrates 10 and the sensor chips 30 will be further described with reference again to FIGS. 5A to 5C. In the following description of the present embodiment, a "right side" denotes the side closer to the sensor substrate 10B in the main-scan direction, and a "left side" denotes the side closer to the sensor substrate 10A in the main-scan direction.

The sensor substrate 10A will be described first. On the sensor substrate 10A, two convex portions 14 (14a and 14b) are formed at an edge 13 on the right side as a connection portion with the sensor substrate 10B so that part of the sensor substrate 10A protrudes toward the right side. Specifically, as shown in FIG. 5B, the convex portions 14 (14a and 14b) protrude toward the right side parallel to the mounting surface 11A from both sides of the edge 13 separated in the sub-scan direction (width direction). Therefore, a concave portion 15 recessed inside of the sensor substrate 10A is formed on a middle portion of the edge 13 in the sub-scan direction. Tips on the right side of the convex portions 14 (14a and 14b) are farthest edges 16 (16a and 16b) positioned at the extreme right of the sensor substrate 10A.

An amount of protrusion of the convex portion 14, that is, a distance L1A (see FIG. 5C) from the farthest edge 16 to a base end 17 of the concave portion 15, is the same as an amount of protrusion of a convex portion 19 of the sensor substrate 10B described later. An interval between the convex portions 14a and 14b, or a dimension L2A in the sub-scan direction in the concave portion 15a here, is formed to have a dimension that allows fitting convex portions 19a and 19b of the sensor substrate 10B described later.

A mounting position of the sensor chip 30 relative to the sensor substrate 10A will be described. The sensor chip $30_4$ that may affect the pixel missing and that may be damaged, that is, the sensor chip $30_4$ close to the side of the adjacent sensor substrate 10B, will be described.

In the sensor chip $30_4$ of the present embodiment, the farthest tip 33B on the right side is positioned inside (left side) of the farthest edges 16 of the sensor substrate 10A described above in the main-scan direction and is positioned outside (right side) beyond the edge 13 (the base end 17 of the concave portion 15) in the main-scan direction. The sensor chip $30_4$ is fixed in this state. In this way, the farthest tip 33B of the sensor chip $30_4$ is positioned inside of the farthest edges 16 of the sensor substrate 10A in the main-scan direction (longitudinal direction). Therefore, even if an obstacle touches the sensor substrate 10A during handling or storage, the convex portions 14a and 14b of the sensor substrate 10A touches the obstacle first rather than the sensor chip $30_4$. As a result, the sensor chip $30_4$ can be protected, and the damage can be prevented. The farthest tip 33B of the sensor chip $30_4$ is positioned between the convex portions 14a and 14b in the sub-scan direction in plan view as shown in FIG. 5B and is surrounded by the convex portions 14a and 14b. Therefore, the effect of the prevention of damage can be further increased.

The sensor substrate 10B will be described. Two convex portions 19 (19a and 19b) are formed on the sensor substrate 10B at an edge 18 on the left side as a connection portion with the sensor substrate 10A so that part of the sensor substrate 10B protrudes to the left side. Specifically, as shown in FIG. 5B, the convex portions 19 (19a and 19b) protrude toward the left side parallel to the mounting surface 11B from both sides closer to the center separated in the sub-scan direction (width direction) in the edge 18. Therefore, a concave portion 20 recessed inside of the sensor substrate 10B is formed at a middle portion in the sub-scan direction in the edge 18, and cut-out portions 21 (21a and 21b) are formed on both sides in the sub-scan direction. Tips on the left side of the convex portions 19 (19a and 19b) are farthest edges 22 (22a and 22b) positioned at the extreme left of the sensor substrate 10B.

An amount of protrusion of the convex portion 19, that is, a distance L1B (see FIG. 5C) from the farthest edge 22 to a base end 23 of the concave portion 20, is the same as the amount of protrusion L1A of the convex portion 14 of the adjacent sensor substrate 10A. A distance from the farthest edges 22 (22a and 22b) to the base ends 24 (24a and 24b) of the cut-out portions 21 (21a and 21b) is also the same as the amount of protrusion L1A. An interval between the convex portions 19a and 19b, or a dimension L2B in the sub-scan direction including the convex portions 19a and 19b as shown in FIG. 5B here, is formed to have a dimension that allows fitting to the concave portion 15 of the edge 13 of the adjacent sensor substrate 10A.

A mounting position of the sensor chip 30 relative to the sensor substrate 10B will be described. The sensor chip $30_5$ that may affect the pixel missing and that may be damaged, that is, the sensor chip $30_5$ close to the side of the adjacent sensor substrate 10A, will be described.

In the sensor chip $30_5$ of the present embodiment, the farthest tip 33A on the left side is positioned inside (right side) of the farthest edges 22 of the sensor substrate 10B described above in the main-scan direction and is positioned outside (left side) beyond the edge 18 (the base end 23 of the concave portion 20) in the main-scan direction. The sensor chip $30_5$ is fixed in this state. In this way, the farthest tip 33A of the sensor chip $30_5$ is positioned inside of the farthest edges 22 of the sensor substrate 10B in the main-scan direction (longitudinal direction). Therefore, even if an obstacle touches the sensor substrate 10B during handling or storage, the convex portions 19a and 19b of the sensor substrate 10B touches the obstacle first rather than the sensor chip $30_5$. As a result, the sensor chip $30_5$ can be protected, and the damage can be prevented. The farthest tip 33A of the sensor chip $30_5$ is positioned between the convex portions 19a and 19b in the sub-scan direction in plan view as shown in FIG. 5B and is surrounded by the convex portions 19a and 19b. Therefore, the effect of the prevention of damage can be further increased.

A method of connecting the sensor substrates 10A and 10B will be described. There is a method in which an assembly worker uses a metallurgical microscope or a stereoscopic microscope to observe and connect the sensor substrates 10A and 10B. Hereinafter, a case in which the assembly worker uses a metallurgical microscope to observe and connect the sensor substrates 10A and 10B will be described.

The assembly worker manufactures in advance the sensor substrates 10A and 10B on which the sensor chips $30_1$ to $30_4$ and $30_5$ to $30_8$ are mounted.

The assembly worker uses a holder to hold the sensor substrates 10A and 10B so that the edge 13 of the sensor substrate 10A and the edge 18 of the sensor substrate 10B face each other as shown in FIG. 5A. In this case, the assembly worker makes an adjustment so that the sensor chips $30_1$ to $30_4$ of the sensor substrate 10A and the sensor chips $30_5$ to $30_8$ of the sensor substrate 10B form a line.

The assembly worker moves the holder to gradually bring the sensor substrates 10A and 10B closer while maintaining the sensor chips $30_1$ to $30_4$ and the sensor chips $30_5$ to $30_8$ to form a line.

Figure 7A:
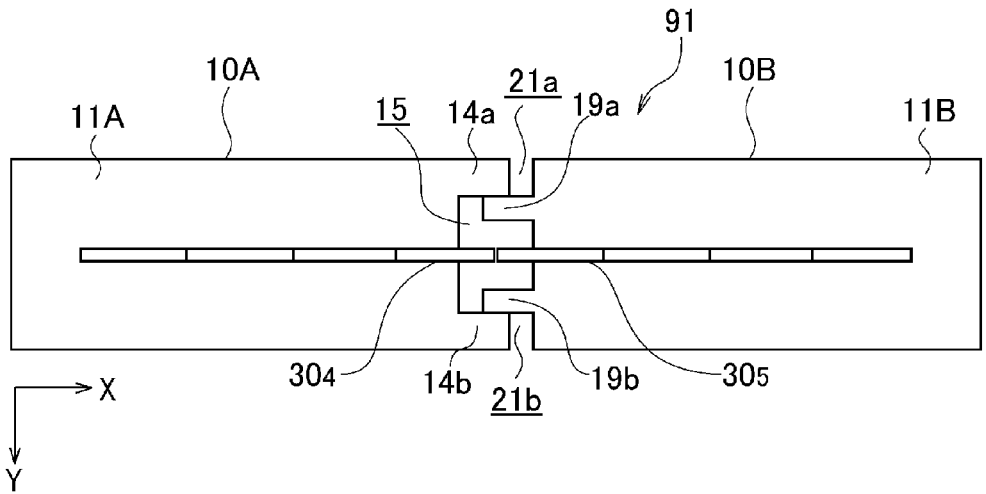
FIG. 7A is a plan view illustrating a state that adjacent sensor substrates 10 are brought into close contact according to the first embodiment.

The sensor substrates 10A and 10B are further brought closer, and the convex portions 19a and 19b of the sensor substrate 10B are fitted to the concave portion 15 of the sensor substrate 10A as shown in FIG. 7A. Meanwhile, the convex portions 14a and 14b of the sensor substrate 10A are fitted to the cut-out portions 21a and 21b of the sensor substrate 10B. In this way, the convex portions 19a, 19b and the concave portion 15 are fitted, and the convex portions 14a, 14b, and the cut-out portions 21a, 21b are fitted to function as connection means. Therefore, the positions of the sensor chips 30 in the sub-scan direction can be accurately determined, and the connection of the sensor substrates 10A and 10B and positioning of the sensor chips $30_4$ and $30_5$ can be performed at the same time.

Figure 7B:
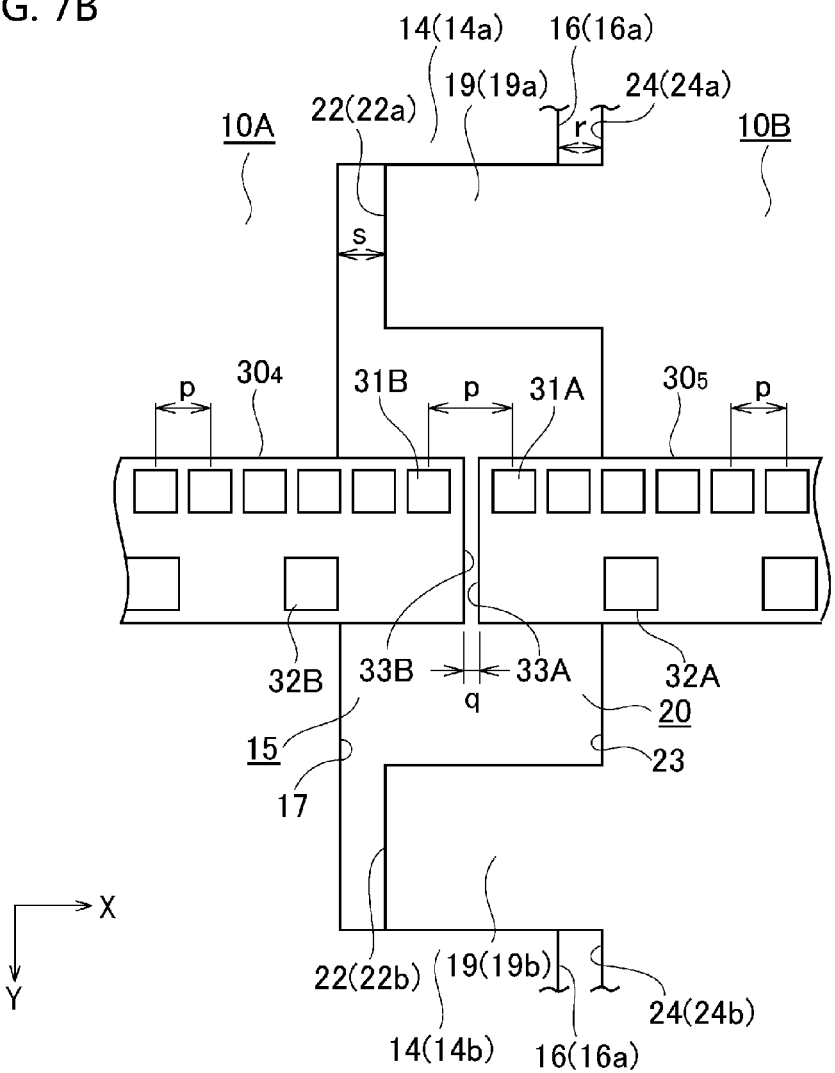
FIG. 7B is an enlarged plan view of the state that the adjacent sensor substrates 10 are brought into close contact according to the first embodiment.

FIG. 7B is an enlarged diagram of the connection portion of the sensor substrates 10A and 10B of FIG. 7A. As shown in FIG. 7B, the assembly worker adjusts the interval between the photodiode 31B of the sensor chip $30_4$ of the sensor substrate 10A and the photodiode 31A of the sensor chip $30_5$ of the sensor substrate 10B to be the same distance as the pitch p of the photodiodes 31.

As described, the farthest tip 33B of the sensor chip $30_4$ is positioned outside of the base end 17 of the concave portion 15 of the sensor substrate 10A, and the farthest tip 33A of the sensor chip $30_5$ is positioned outside of the base end 23 of the concave portion 20 of the sensor substrate 10B. Therefore, other than the sensor chip 30, there is no obstacle that touches the sensor chip 30 in the space surrounded by the concave portions 15 and 20 in plan view. As a result, the intervals of the sensor chips 30 can be accurately determined without being inhibited by obstacles.

The interval between the photodiode 31B of the sensor chip $30_4$ and the photodiode 31A of the sensor chip $30_5$ may not be the same distance as the pitch p and may be a distance greater than the pitch p if the distance is a predetermined distance. More specifically, as long as the interval between the photodiode 31B of the sensor chip $30_4$ and the photodiode 31A of the sensor chip $30_5$ is a predetermined distance, the image can be interpolated based on the predetermined distance after the image is read by the image sensor unit 1.

As shown in FIG. 7B, when the distance between the photodiode 31B of the sensor chip $30_4$ and the photodiode 31A of the sensor chip $30_5$ is the pitch p or the predetermined distance, there is a gap (distance q shown FIG. 7B) between the farthest tip 33B of the sensor chip $30_4$ and the farthest tip 33A of the sensor chip $30_5$. The distance q of the gap is set to be smaller than a distance r between the farthest edge 16 of the convex portion 14 and the base end 24 of the cut-out portion 21 and smaller than a distance s between the farthest edge 22 of the convex portion 19 and the base end 17 of the concave portion 15. Therefore, the contact of the farthest edge 16 of the convex portion 14 with the base end 24 of the cut-out portion 21 or the contact of the farthest edge 22 of the convex portion 19 with the base end 17 of the concave portion 15 can be prevented before the distance between the photodiode 31B of the sensor chip $30_4$ and the photodiode 31A of the sensor chip $30_5$ is adjusted to the pitch p or the predetermined distance.

Figure 8A:
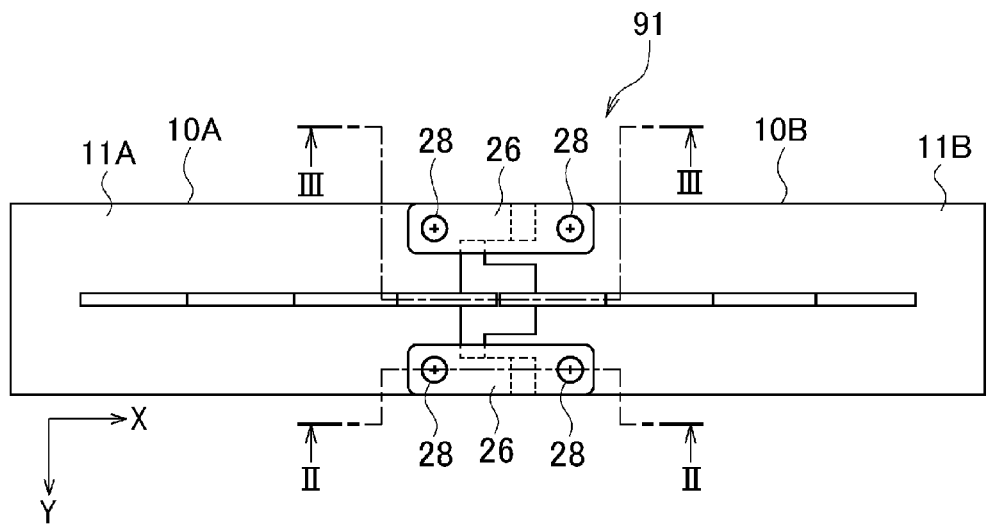
FIG. 8A is a plan view illustrating a state that the sensor substrates 10 are fixed by fixation members 26 according to the first embodiment.
Figure 8B:
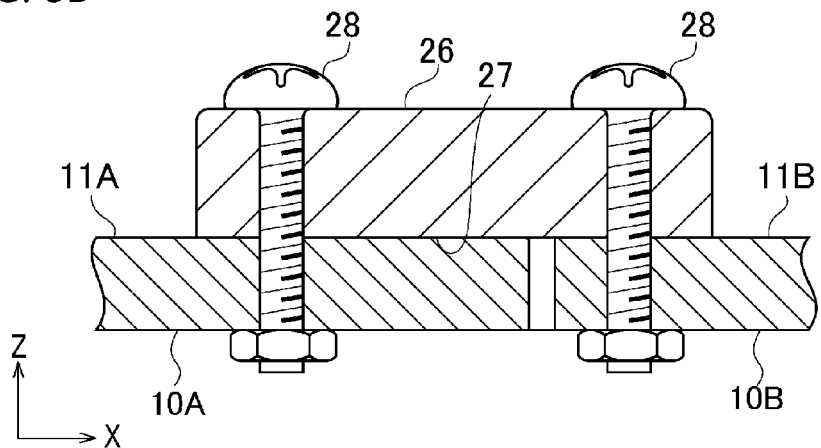
FIG. 8B is a section view of the state that the sensor substrates 10 are fixed by the fixation members 26 according to the first embodiment.
Figure 8C:
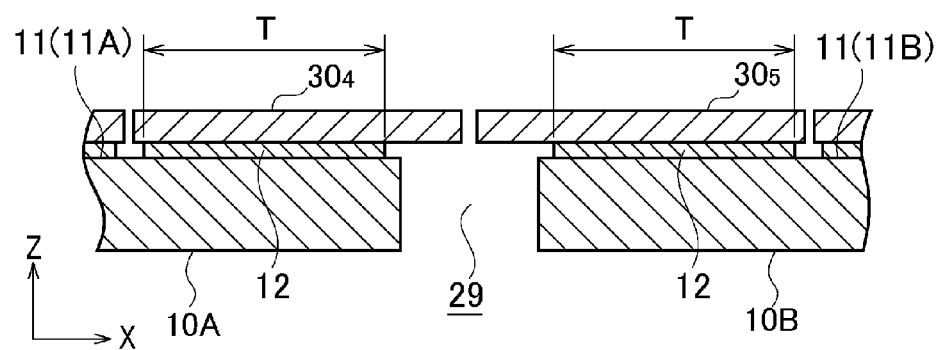
FIG. 8C is a sectional view of the state that the sensor substrates 10 are fixed by the fixation members 26 according to the first embodiment.

After the completion of the adjustment of the distance between the sensor substrates 10, the assembly worker fixes the fixation members 26 to the mounting surfaces 11A and 11B. FIG. 8A is a plan view illustrating a state that the sensor substrates 10A and 10B are fixed by the fixation members 26. FIG. 8B is a sectional view of a II-II line shown in FIG. 8A. FIG. 8C is a sectional view of a line shown in FIG. 8A.

As shown in FIGS. 8A and 8B, the fixation members 26 of the present embodiment are formed in a rectangular planar shape and are fixed at two sections on both sides of the sensor substrates 10A and 10B in the sub-scan direction (width direction). Specifically, the fixation members 26 are fixed across the mounting surface 11A of the sensor substrate 10A and the mounting surface 11B of the sensor substrate 10B, with a gap between the sensor substrates 10A and 10B in the main-scan direction (longitudinal direction). Screws 28 are used to fix the fixation members 26 on the mounting surfaces 11A and 11B. Therefore, the fixation members 26 connect the sensor substrates 10, while the distance between the sensor substrates 10 is held.

As shown in FIG. 8B, an abutment surface 27 of the fixation member 26 abutted with the mounting surface 11A of the sensor substrate 10A and the mounting surface 11B of the sensor substrate 10B is formed in a flat surface. Therefore, the mounting surface 11A of the sensor substrate 10A and the mounting surface 11B of the sensor substrate 10B can be held in a flush state, and the sensor chips $30_1$ to $30_8$ mounted on the mounting surfaces 11A and 11B can also be held in a flush state.

The fixation members 26 are at least formed by a material with a coefficient of linear expansion lower than that of the sensor substrates 10A and 10B. Since the fixation members 26 are fixed to the mounting surface 11A of the sensor substrate 10A and the mounting surface 11B of the sensor substrate 10B, expansion and contraction of the fixation members 26 may affect the distance between the photodiode 31B of the sensor chip $30_4$ and the photodiode 31A of the sensor chip $30_5$. Therefore, the fixation members 26 can be formed by a material with a coefficient of linear expansion lower than that of the material of the sensor substrates 10A and 10B to reduce the change in the distance between the photodiodes 31b and 31a. More specifically, even if the temperature of the storage location drops when the image sensor unit 1 is stored without being used, the contact of the sensor chips $30_4$ and $30_5$ can be prevented by reducing the contraction of the fixation members 26 in the main-scan direction.

As shown in FIG. 8C, the sensor substrates 10A and 10B are not disposed below the section where the sensor chips $30_4$ and $30_5$ face each other, and a space 29 is formed by the concave portions 15 and 20. Even if the flush state cannot be maintained between the sensor chips $30_4$ and $30_5$ and there is a difference in level in the direction orthogonal to the mounting surface 11, the formation of the space 29 can prevent the sensor chip 30 in the lower level from touching the mounting surface 11 of the sensor substrate 10.

In the state shown in FIG. 7B, the assembly worker uses thin metallic wires to electrically connect, by wire bonding, the input/output pad 32B of the sensor chip $30_4$ of the sensor substrate 10A and the input/output pad 32A of the sensor chip $30_5$ of the sensor substrate 10B. In this case, there is no space 29 shown in FIG. 8C below the pads 32A and 32B, and there are the mounting surfaces 11A and 11B of the sensor substrates 10A and 10B. More specifically, there is the adhesive 12 for fixing the sensor substrates 10A and 10B with the sensor chips $30_4$ and $30_5$. Therefore, even if the pads 32A and 32B are pressurized by wire bonding, the adhesive 12 and the sensor substrates 10A and 10B can support the force, and the load on the sensor chips $30_4$ and $30_5$ can be reduced. Therefore, when the sensor chips $30_4$ and $30_5$ are mounted on the sensor substrates 10A and 10B, the input/output pads 32A and 32B are fixed at positions within a range (area T shown in FIG. 8C) where the adhesive 12 is applied. The electric connection by wire bonding using the thin metallic wires may be performed just after the mounting of the sensor chips $30_1$ to $30_4$ and $30_5$ to $30_8$ on the sensor substrates 10A and 10B by the assembly worker.

Figure 4:
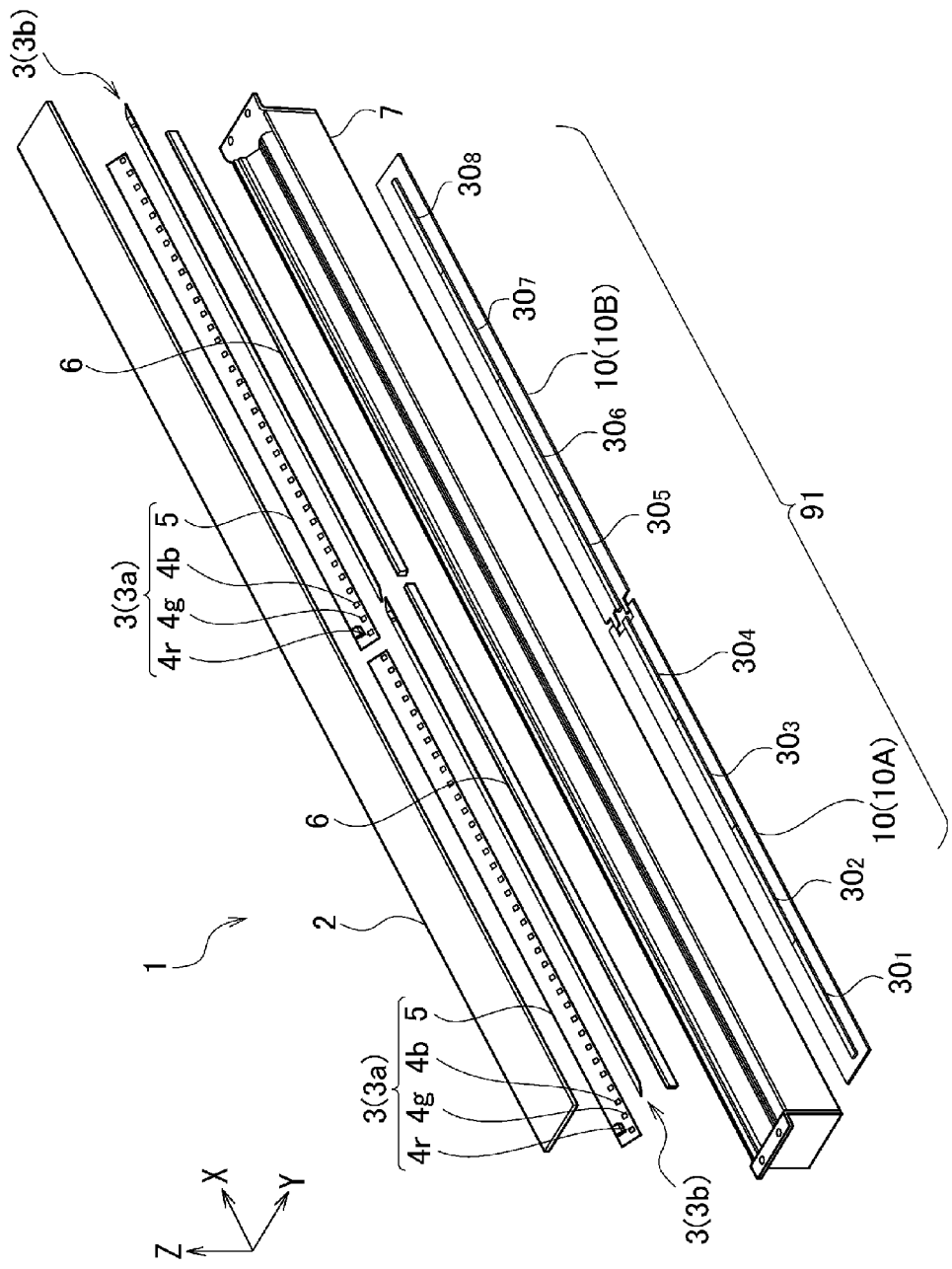
FIG. 4 is a schematic exploded perspective view of the image sensor unit 1 according to the present embodiments.

The assembly worker incorporates the sensor substrate unit 91 connected sensor substrates 10A and 10B into the frame 7 shown in FIG. 4 to fix the sensor substrate unit 91 to the frame 7 by screws or adhesive to manufacture the image sensor unit 1. In this way, the pitch p or the predetermined distance is maintained between the sensor chips $30_4$ and $30_5$ in the manufactured image sensor unit 1 as described above, and the image can be read without missing pixels.

In this way, the farthest tips 33B and 33A of the sensor chips $30_4$ and $30_5$ mounted on the sensor substrates 10A and 10B are positioned inside of the farthest edges 16 and 22 of the sensor substrates 10A and 10B in the present embodiment. Therefore, even if an obstacle touches the sensor substrates 10A and 10B during handling or storage, the obstacle touches the convex portions 14 and 19 including the farthest edges 16 and 22 of the sensor substrates 10A and 10B rather than the sensor chips $30_4$ and $30_5$. As a result, the sensor chips $30_4$ and $30_5$ can be protected, and the damage can be prevented.

(Second Embodiment)

Figure 9:
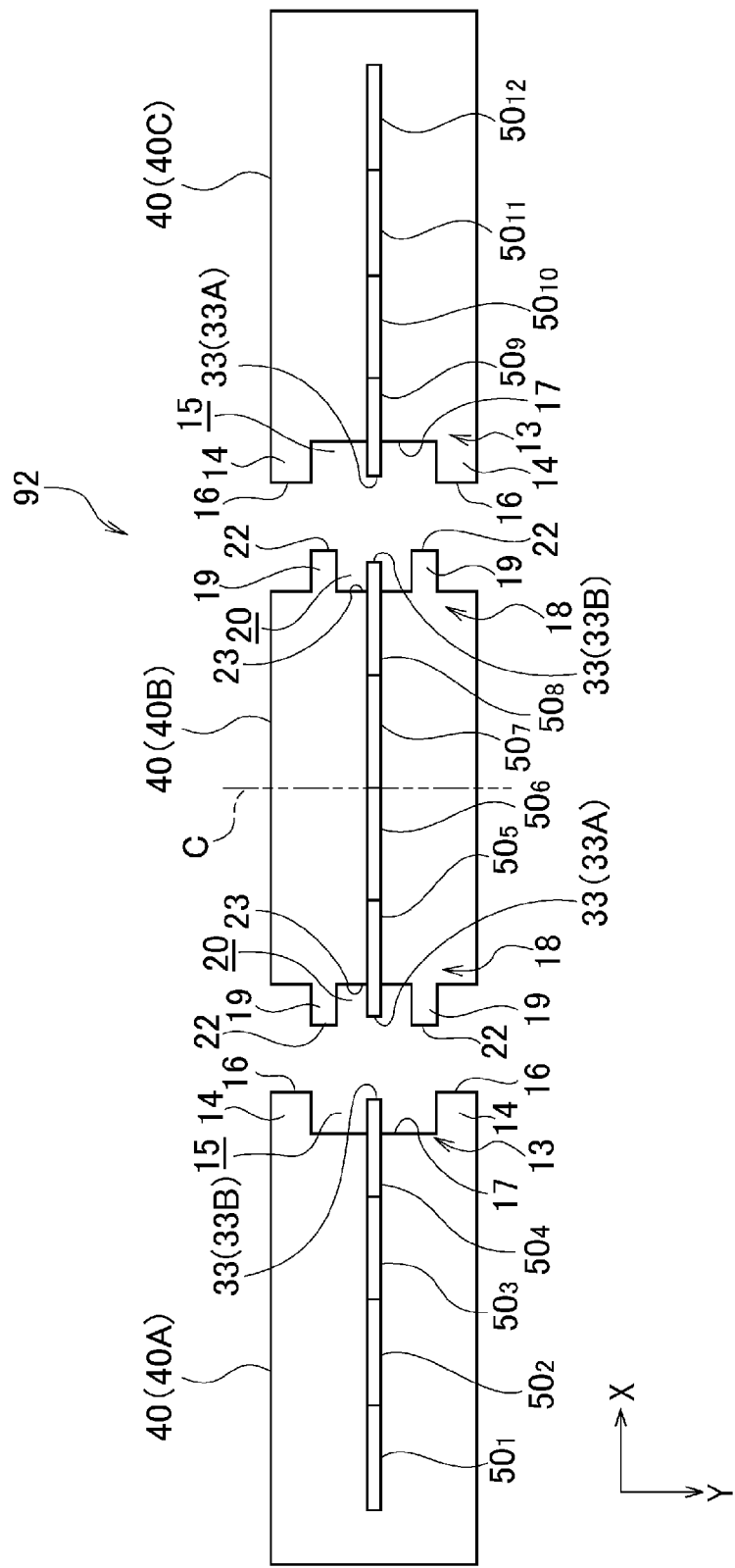
FIG. 9 is a plan view of a sensor substrate unit 92 according to a second embodiment.

The case of connecting the two sensor substrates 10A and 10B has been described in the first embodiment. A case of connecting three sensor substrates 40A, 40B, and 40C will be described in the present embodiment. FIG. 9 is a plan view illustrating configurations of a sensor substrate unit 92 according to the present embodiment. A plurality of (four each in FIG. 9) sensor chips 50 ($50_1$ to $50_4$, $50_5$ to $50_8$, and $50_9$ to $50_{12}$) are mounted on the mounting surfaces of the sensor substrates 40A, 40B, and 40C, and the sensor chips 50 are linearly arranged in the main-scan direction (longitudinal direction) on the sensor substrates 40A, 40B, and 40C.

As shown in FIG. 9, the sensor substrates 40A and 40C on both sides in the main-scan direction of the three sensor substrates have similar components to those of the sensor substrate 10A of the first embodiment. The similar components to those of the first embodiment are designated with the same reference numerals in FIG. 9.

More specifically, the convex portions 14 protruding from both sides in the sub-scan direction toward the sensor substrate 40B are formed at the edges 13 of the sensor substrates 40A and 40C adjacent to the sensor substrate 40B, and the concave portions 15 are formed between the convex portions 14. The farthest tips 33 (33B and 33A) of the sensor chips $50_4$ and $50_9$ mounted on the sensor substrates 40A and 40C are positioned inside of the farthest edges 16 of the convex portions 14 in the main-scan direction and are positioned outside of the base ends 17 of the concave portions 15 in the main-scan direction.

Meanwhile, the sensor substrate 40B is formed in a shape line-symmetric to a center line c in the sub-scan direction. More specifically, the convex portions 19 protruding from both sides closer to the center in the sub-scan direction at the edges 18 on both sides in the main-scan direction toward the sensor substrates 40A and 40C are formed on the sensor substrate 40B, and the concave portions 20 are formed between the convex portions 19. The farthest tips 33 (33A and 33B) of the photoelectric conversion elements $50_5$ and $50_8$ mounted on the sensor substrate 40B are positioned inside of the farthest edges 22 of the convex portions 19 in the main-scan direction and are positioned outside of the base ends 23 of the concave portions 20 in the main-scan direction.

Therefore, even if an obstacle touches the sensor substrates 40A, 40B, and 40C during handling or storage, the obstacle first touches the farthest edges 16 and 22 of the sensor substrates 40A, 40B, and 40C rather than the sensor chips $50_4$, $50_5$, $50_8$, and $50_9$. As a result, the sensor chips $50_4$, $50_5$, $50_8$, and $50_9$ can be protected, and the damage can be prevented. The assembly method of the sensor substrates 40A, 40B, and 40C is similar to that of the first embodiment, and the description will not be repeated.

Although the present invention has been described with various embodiments, the present invention is not limited to the embodiments, and changes and the like can be made within the scope of the present invention.

For example, the case of connecting the three sensor substrates 40A, 40B, and 40C has been described in the second embodiment, the case is not limited to this. A case of connecting four or more sensor substrates can be similarly applied.

Although the case of forming the two convex portions 14 (14a and 14b) and the two convex portions 19 (19a and 19b) on the sensor substrates 10A and 10B has been described in the embodiments, it is only necessary that at least two convex portions are formed. For example, two or more convex portions may be formed.

The image reading apparatus is not limited to the sheet-feed type image scanner, and an image scanner with a flat-bet type image scanner configuration can also be similarly applied.

The case of arranging the individual sensor chips 30 (sensor chips 50) in a line in the main-scan direction (longitudinal direction), specifically, in a straight line, has been described in the present embodiments. However, the arrangement is not limited to this, and a case of arranging the individual sensor chips in a staggered manner can also be similarly applied.

Figure 10:
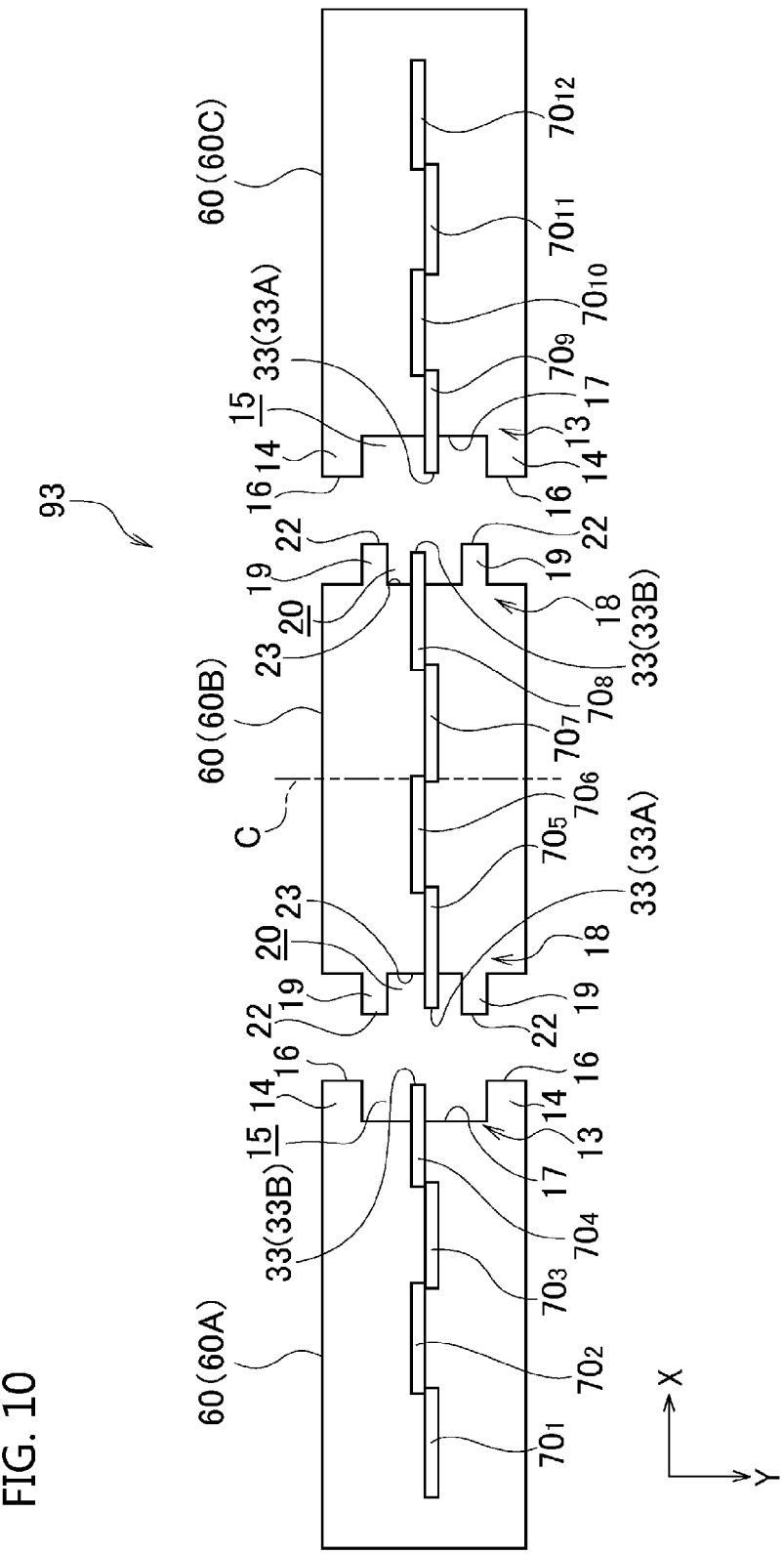
FIG. 10 is a plan view of a sensor substrate unit 93 according to another embodiment.

FIG. 10 is a plan view of a sensor substrate unit 93 according to another embodiment. A plurality of (four each in FIG. 10) sensor chips 70 ($70_1$ to $70_4$, $70_5$ to $70_8$, and $70_9$ to $70_{12}$) are mounted on mounting surfaces of sensor substrates 60A, 60B, and 60C. In FIG. 10, the individual sensor chips $70_1$ to $70_4$ mounted on the sensor substrate 60A are alternately shifted in the width direction to form a staggered arrangement. The individual sensor chips $70_5$ to $70_8$ and $70_9$ to $70_{12}$ of the sensor substrates 60B and 60C are similarly arranged in the staggered manner. In this way, the arrangement in a line is not limited to the arrangement in a straight light, and the arrangement in a staggered manner that can be approximated to the arrangement in a line is also included.

In the description of the present embodiments, when the adjacent sensor substrates 10 (sensor substrates 40) are connected to each other, the sensor chips $30_1$ to $30_4$ and $30_5$ to $30_8$ (sensor chips $50_1$ to $50_4$, $50_5$ to $50_8$, and $50_9$ to $50_{12}$) form a line, specifically, a straight line. However, the arrangement is not limited to this, and a case of connecting the sensor substrates so that the sensor chips are arranged in a staggered manner when a plurality of sensor chips on the sensor substrate are seen as one sensor chip can also be similarly applied.

FIG. 11 is a plan view of a sensor substrate unit 94 of another embodiment. A plurality of (four each in FIG. 11) sensor chips 90 ($90_1$ to $90_4$, $90_5$ to $90_8$, $90_9$ to $90_{12}$) are mounted on mounting surfaces of sensor substrates 80A, 80B, and 80C, the sensor chips 90 arranged in a straight line on the sensor substrates 80A, 80B, and 80C. In FIG. 11, the sensor chips $90_1$ to $90_4$ mounted on the sensor substrate 80A and the sensor chips $90_5$ to $90_8$ mounted on the sensor substrate 80B are shifted in the sub-scan direction. The sensor chips $90_5$ to $90_8$ mounted on the sensor substrate 80B and the sensor chips $90_9$ to $90_{12}$ mounted on the sensor substrate 80C are shifted in the sub-scan direction. Therefore, the sensor substrates 80A, 80B, and 80C are connected so that the sensor chips are arranged in a staggered manner when the sensor chips $90_1$ to $90_4$, $90_5$ to $90_8$, and $90_9$ to $90_{12}$ are seen as one sensor chip each.

The image sensor unit, the image reading apparatus, and the image forming apparatus according to the present invention are to prevent damage to sensor chips.

What is claimed is:

1. An image sensor unit comprising:
    a light source that illuminates an object to be read;
    a sensor substrate unit that is connected with a plurality of sensor substrates comprising a plurality of photoelectric conversion elements arranged and mounted in a line in a longitudinal direction that is a main-scan direction;
    a light condenser that focuses light from the object to be read on the sensor substrate unit; and
    a supporting body that supports the light source, the sensor substrate unit, and the light condenser, wherein
    the sensor substrate unit is formed by connecting edges of the sensor substrates in the longitudinal direction,
    at the edges of the sensor substrates, a convex portion is formed that protrudes in the longitudinal direction of the sensor substrates from positions on base ends not to overlap the photoelectric conversion elements in plan view,
    farthest tips of the photoelectric conversion elements are positioned outside of the base ends in the longitudinal direction of the sensor substrates, and inside of farthest edges of the convex portions in the longitudinal direction of the sensor substrates, and
    the sensor substrates to be connected are connected to each other so that a distance of a gap in the main-scan direction formed between the farthest tips of the photoelectric conversion elements is smaller than a distance of a gap in the main-scan direction formed between the farthest edge of the convex portion of one of the sensor substrates and the base end of the other of the sensor substrates.

2. The image sensor unit according to claim 1, wherein
    two convex portions are formed at the edges, and
    the photoelectric conversion elements are disposed between the two convex portions in plan view.

3. The image sensor unit according to claim 2, wherein
    the sensor substrates are connected to each other by the two convex portions of the one of the sensor substrates being fitted to concave portions formed between the two convex portions of the other of the sensor substrates.

4. The image sensor unit according to claim 1, further comprising fixation members fixed to the mounting surfaces across the mounting surfaces between the connected sensor substrates.

5. The image sensor unit according to claim 4, wherein a coefficient of linear expansion of the fixation members is lower than a coefficient of linear expansion of the sensor substrates.

6. The image sensor unit according to claim 1, wherein the photoelectric conversion element comprises a pad connected to another circuit pattern by wire bonding using a thin metallic wire, and
the pad is positioned inside of the edges of the sensor substrate in the longitudinal direction.

7. An image reading apparatus comprising:
an image sensor unit; and
image reading means that reads light from an object to be read while relatively moving the image sensor unit and the object to be read, wherein
the image sensor unit comprising:
a light source that illuminates the object to be read;
a sensor substrate unit that is connected with a plurality of sensor substrates comprising a plurality of photoelectric conversion elements arranged and mounted in a line in a longitudinal direction that is a main-scan direction;
a light condenser that focuses light from the object to be read on the sensor substrate unit; and
a supporting body that supports the light source, the sensor substrate unit, and the light condenser, wherein
the sensor substrate unit is formed by connecting edges of the sensor substrates in the longitudinal direction,
at the edges of the sensor substrates, a convex portion is formed that protrudes in the longitudinal direction of the sensor substrates from positions on base ends not to overlap the photoelectric conversion elements in plan view,
farthest tips of the photoelectric conversion elements are positioned outside of the base ends in the longitudinal direction of the sensor substrates, and inside of farthest edges of the convex portions in the longitudinal direction of the sensor substrates, and
the sensor substrates to be connected are connected to each other so that a distance of a gap in the main-scan direction formed between the farthest tips of the photoelectric conversion elements is smaller than a distance of a gap in the main-scan direction formed between the farthest edge of the convex portion of one of the sensor substrates and the base end of the other of the sensor substrates.

8. An image forming apparatus comprising:
an image sensor unit;
image reading means that reads light from an object to be read while relatively moving the image sensor unit and the object to be read; and
image forming means that forms an image on a recording medium, wherein
the image sensor unit comprising:
a light source that illuminates the object to be read;
a sensor substrate unit that is connected with a plurality of sensor substrates comprising a plurality of photoelectric conversion elements arranged and mounted in a line in a longitudinal direction that is a main-scan direction;
a light condenser that focuses light from the object to be read on the sensor substrate unit; and
a supporting body that supports the light source, the sensor substrate unit, and the light condenser, wherein
the sensor substrate unit is formed by connecting edges of the plurality of sensor substrates in the longitudinal direction,
at the edges of the sensor substrates, a convex portion is formed that protrudes in the longitudinal direction of the sensor substrates from positions on base ends not to overlap the photoelectric conversion elements in plan view,
farthest tips of the photoelectric conversion elements are positioned outside of the base ends in the longitudinal direction of the sensor substrates, and inside of farthest edges of the convex portions in the longitudinal direction of the sensor substrates, and
the sensor substrates to be connected are connected to each other so that a distance of a gap in the main-scan direction formed between the farthest tips of the photoelectric conversion elements is smaller than a distance of a gap in the main-scan direction formed between the farthest edge of the convex portion of one of the sensor substrates and the base end of the other of the sensor substrates.

* * * * *